UNITED STATES PATENT OFFICE.

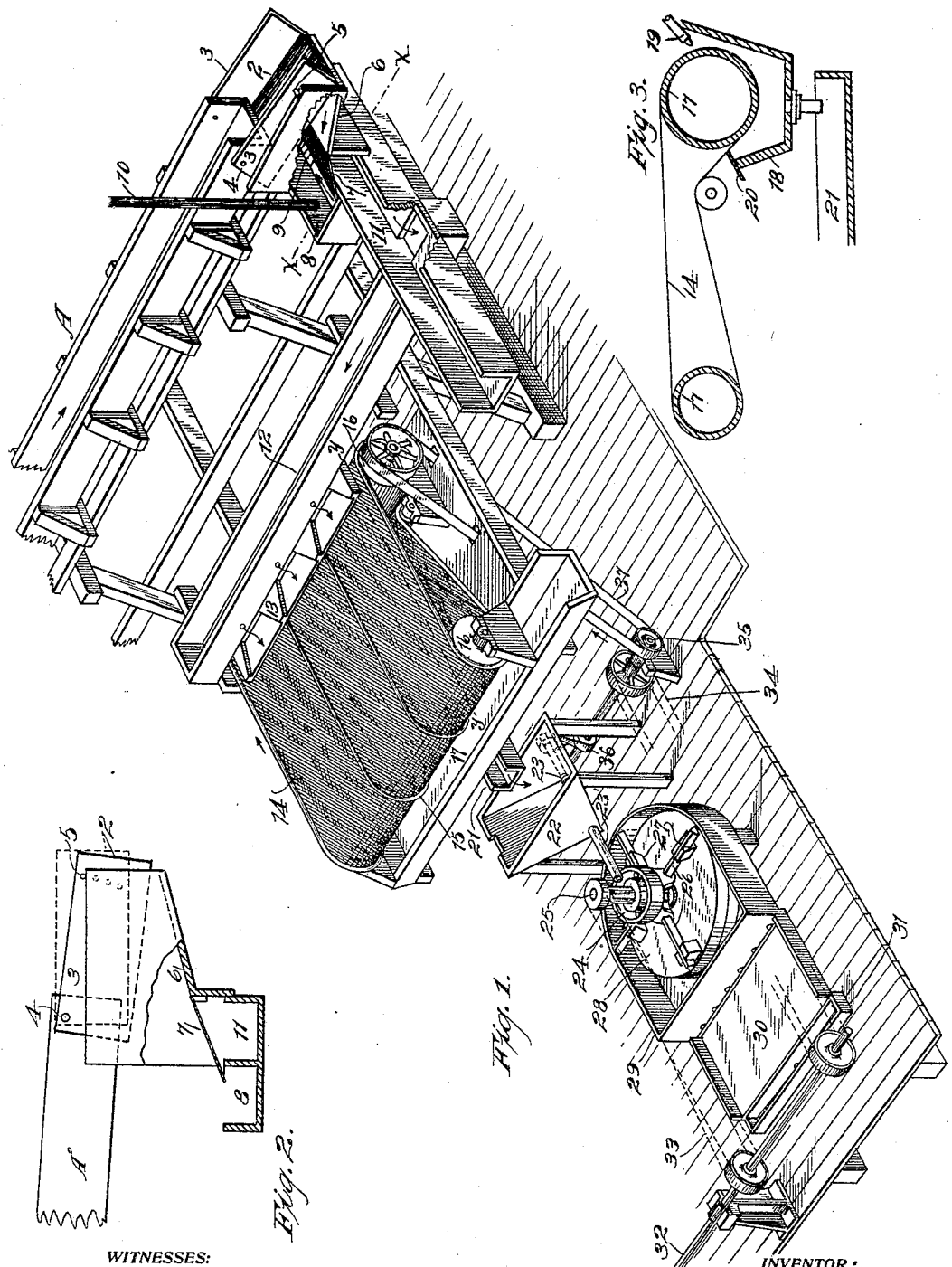

VICTOR P. YELMINI, OF ALAMEDA, CALIFORNIA.

GOLD-SAVING APPARATUS.

932,936.

Specification of Letters Patent. Patented Aug. 31, 1909.

Application filed February 14, 1908, Serial No. 415,902. Renewed February 11, 1909. Serial No. 477,462.

*To all whom it may concern:*

Be it known that I, VICTOR P. YELMINI, citizen of the United States, residing at Alameda, in the county of Alameda and State of California, have invented new and useful Improvements in Gold - Saving Apparatus, of which the following is a specification.

My invention relates to apparatus for saving gold, and other precious and valuable metals and minerals.

The present apparatus has been designed particularly for the purpose of handling economically large quantities of old tailings, gravels, sand, and other deposits of low grade, and carrying whatever values they have in very fine form; which values have been lost in previous handling, and which values are not ordinarily recoverable by apparatus now in use. It will be manifest, however, that the apparatus about to be described can be used in new claims and virgin deposits of either high or low grade.

The invention consists of the parts and the construction and combination of parts as hereinafter more fully described and claimed, having reference to the accompanying drawings, in which—

Figure 1 is a perspective view of the apparatus. Fig. 2 is a detail sectional view on line X—X, Fig. 1. Fig. 3 is a similar view on line Y—Y, Fig. 1.

A represents a sluice box into which the auriferous material is dumped, and by which sluice box the same is delivered on to a grizzly 2. This grizzly has the sides 3, and is hinged to the sluice box at 4, so that it can be raised or lowered to vary the inclination of the grizzly; suitable means, as the pins 5 being employed to maintain the grizzly at any desired inclination, according to the flow of water, or the character of the material being worked. The slats of this grizzly are any desired distance apart, according to what degree of separation at this point it is desired to make.

It is the purpose of the invention to allow all the finer stuff and anything which might contain values to pass through this grizzly and fall on to a short chute 6; the coarser gravel, stones, etc., passing off over the end of the grizzly on to the dump. The matter which falls through into the chute 6 passes on to a screen 7, by which a further segregation takes place; this time any coarse gold and coarser gravel passing on over the screen 7 and into the sluice 8, in which latter are arranged riffles 9 by which the coarse gold in sluice 8 will be caught.

A sufficient quantity of water is fed into the sluice 8 from the pipe 10. The water and finer material and values passing through the screen 7 are caught in the laterally extending sluice 11, and thence delivered into a launder 12, which has suitable openings allowing the water and material therein to discharge over the distributing board or apron 13. This apron is adapted to distribute the material to the endless concentrator belt 14, which may be provided, if desired, with the longitudinally extending ribs 15, which ribs are provided for the purpose of maintaining an even flow and distribution of the stuff over the belt. This belt passes around suitable rollers 16, and is inclined to travel upward toward the apron 13; the water and lighter and worthless matter passing down the belt and discharging into the trough 17. The concentrates pass on around the belt underneath the apron, and are scraped and washed off into the head trough 18; the washing being done by suitable jet pipes 19; the scraper being represented at 20.

The bottom of the trough 18 is inclined from opposite ends toward the center, so that all the concentrates are collected at this point and conveyed through the sluice 21 into the settling tank 22.

In the bottom of the settling tank is a screw conveyer 23 operating in the discharge conduit 23′, by which the concentrated and settled pulp, in the form of a heavy mud, is delivered centrally into an annular feed hopper 24 of the amalgamating apparatus. This amalgamating apparatus is of special design, and comprises a vertical shaft 25 which is provided with the radially extending arms 26. At various intervals on these several arms are adjustably attached the polishing and amalgamating shoes 27. The feed hopper 24 discharges centrally downward on to the amalgamating surface or table 28 adjacent to the inner ends of the arms 26. The arms are adapted to be revolved at suitable speed; that is, from sixty to eighty or more revolutions per minute, and the shoes rest by gravity on the table 28. The rapid operation of the shoes works the material outward over the table, polishing the fine gold, so that when it comes in contact with the mercury, it will rapidly form an amalgam, and thus be easily saved.

The water, amalgam, and other material on the table 28 is collected in the surrounding pan 29, and discharged at the front edge thereof on to the silvered or amalgam plates 30; the final residue, in the form of water and worthless gangue, passing off through the sluices 31.

Any suitable form of mechanism and any appropriate form of connections may be employed to operate the various driven portions of the apparatus. As here shown, power is taken off from a shaft 32 by a belt 33 to operate the amalgamator. Another belt 34 runs from the pulley on shaft 32 to a counter-shaft 35. From this counter-shaft the screw conveyer 23 is operated by suitable connections, as indicated at 36. The concentrator belt 14 is also operated from the counter-shaft 35 by the belt 37.

The operation of the apparatus is as follows: The grizzly 2 is adjusted to the proper inclination and the water turned into the sluice A, and the power shaft and various operating parts of the machine set in motion. The material to be treated, from any suitable source of supply, is dumped into the sluice, and the various separations take place through the grizzly, and screen 7, as previously described, the finer values passing down through the lateral sluice 11 into launder 12, thence over the distributing apron 13 on to the concentrator belt 14. The concentrates on the belt are carried on over into the trough 18 and therein collected, and conveyed thence by the underneath sluice 21 into the settling tank 22; the excess water and floating gangue in the settling tank overflowing at 22′. The screw conveyer 23 takes the settlings and conveys them thence through the tubular conduit extension 23′ into the hopper 24.

If acid is necessary for the treatment of the material in the amalgamator it can be added, and mercury is added from time to time, as needed for the purposes of amalgamation. The fine gold, being first polished by the grinding action of the shoes 27 on the table, is readily amalgamated, and subsequently collected on the silvered plates 30.

Having thus described my invention, what I claim and desire to secure by Letters Patent is—

An improved gold saving apparatus having in combination a feed sluice, a grizzly at the end thereof and onto which the material is delivered, said grizzly being adapted to be raised or lowered to vary its inclination, a chute beneath the grizzly and inclined relative thereto, a screen fixed to the inner end of said chute extending inwardly beneath the sluice, parallel sluices beneath the grizzly and the first-named sluice and extending at right-angles thereto, one of said sluices underlying said screen and adapted to receive the material passing therethrough, the other of the parallel sluices receiving the material delivered over said screen, said other parallel sluice being provided with riffles, a launder arranged parallel with the first-named sluice and at right-angles to the parallel sluices and connecting with one of the latter, and a concentrator operating at right angles to the launder and adapted to receive the material therefrom.

In testimony whereof I have hereunto set my hand in presence of two subscribing witnesses.

VICTOR P. YELMINI.

Witnesses:
C. K. MARSHALL,
JOHN A. BECKWITH.